US006717691B1

(12) United States Patent
Pilsl et al.

(10) Patent No.: US 6,717,691 B1
(45) Date of Patent: Apr. 6, 2004

(54) METHOD FOR CONTROLLING A PRINTER WITH A PLURALITY OF INPUT LOCATIONS FOR CARRIER MATERIAL

(75) Inventors: Stephan Pilsl, Roehrmoos (DE); Bernward Heller, Kirchheim (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/462,537

(22) PCT Filed: Jul. 9, 1998

(86) PCT No.: PCT/EP98/04273

§ 371 (c)(1), (2), (4) Date: Mar. 29, 2000

(87) PCT Pub. No.: WO99/02438

PCT Pub. Date: Jan. 21, 1999

(30) Foreign Application Priority Data

Jul. 9, 1997 (DE) ........................................ 197 29 389

(51) Int. Cl.[7] ................................................ G06K 15/00

(52) U.S. Cl. ....................................... 358/1.15; 358/1.1

(58) Field of Search ......................... 358/1.1, 1.9, 1.12, 358/1.13, 1.15, 1.16, 296, 498, 400; 271/259

(56) References Cited

U.S. PATENT DOCUMENTS

| | | | | |
|---|---|---|---|---|
| 4,188,138 A | * | 2/1980 | Yamazaki | 400/586 |
| 4,265,440 A | | 5/1981 | Shibazaki et al. | 271/9.06 |
| 4,763,889 A | | 8/1988 | Dei et al. | 271/9.03 |
| 5,072,401 A | * | 12/1991 | Sansone et al. | 700/219 |
| 5,093,915 A | * | 3/1992 | Platteter et al. | 713/2 |
| 5,267,238 A | * | 11/1993 | Yano et al. | 370/452 |
| 5,684,706 A | * | 11/1997 | Harman et al. | 700/95 |
| 6,154,286 A | * | 11/2000 | Konno et al. | 358/1.13 |

FOREIGN PATENT DOCUMENTS

| | | |
|---|---|---|
| DE | 34 44 557 | 6/1985 |

OTHER PUBLICATIONS

Born, Referenzhandbuch Dateiformate—Grafik, Text, Datenbanken, Tabellenkalkulation, Addison–Wesley Publishing Company.

* cited by examiner

*Primary Examiner*—Gabriel Garcia
(74) *Attorney, Agent, or Firm*—Schiff Hardin LLP

(57) ABSTRACT

A method and apparatus for inputting a recording medium, such as paper, into a printer includes a plurality of input stations and each station having a plurality input compartments. The input stations are connected in a cascade arrangement, and an automatic switch is made from one input station to another input station upon the occurance of a signal indicating the input station is empty or a malfunction has occurred. Printing continues without interruption.

15 Claims, 6 Drawing Sheets

METHOD FOR CONTROLLING A PRINTER WITH A PLURALITY OF INPUT LOCATIONS FOR CARRIER MATERIAL

BACKGROUND OF THE INVENTION

1. Field of the Invention

The present invention is directed to a method for controlling a printer, particularly a high-performance printer, having a plurality of input locations for carrier material, whereby the print information are offered in a standard page description language. The invention is also directed to a printer wherein the method is realized.

2. Description of the Related Art

In what is referred to as "remote mode", a printer is supplied with print information according to a standard page description language from a higher-ranking control. Such a page description language describes the content and appearance of all elements of a page to be printed, for example the text, vector graphics, images, etc., on the basis of hardware-independent instructions. The device control generally contains an interpreter for this standard page description language and converts the supplied printing information into the corresponding hardware signals with which, for example, the character generator for producing the picture elements is driven in a laser printer. Known page description languages are PostScipt, PCL (printer command language), particularly version PCL5, or IPDS(Intelligent Printer Data Steam).

The standard page description languages define a single input location from a plurality of possible input locations for the carrier material by specifying a destination address, which is then accessed supported by the device control. The result thereof is that the paper supply in the indicated input compartment is consumed after a specific time. The device control then stops the printing process and an operator resupplies new carrier material. What is disadvantageous in the known method is that larger printing jobs cannot be implemented without interruption and the time intervals for required replenishment of carrier material are relatively short.

U.S. Pat. No. 4,763,889 A discloses a printer with a plurality of input compartments that are driven by a central control as needed. The control thereby determines whether paper is still present in a first input compartment and switches to another input compartment when the first compartment is empty. What is disadvantageous about this printer is that the total number of input compartments is limited to a low number. As a result thereof, both the multiplicity of different recording material (paper, film, formats) to be processed as well as the total number of pages available for the respective grades of recording material, are limited.

SUMMARY OF THE INVENTION

An object of the invention is to specify a printing system and a method for the control thereof wherein an interruption-free printing operation is possible for a relatively long time.

This object is achieved by a method for controlling a printer, particularly a high-performance printer, having a plurality of input stations that each respectively comprise a plurality of input locations. The carrier material to be printed is thereby supplied from one of the input locations and the print information are offered in a standard page description language, from which a device control of the printer determines the information before printing, whereby the page description language indicates the single input location with a destination address. The device control assigns at least two input locations to a common logical device address and also assigns the logical device address to the destination address. Given occurrence of a predetermined operating condition of one of the input locations under the logical device address, a switch is made to the other input location and the carrier material is then supplied from the other input location 1.

What the invention achieves in the remote mode operating condition is that at least two input locations, i.e. two input compartments—a plurality of input compartments can also be provided given larger print jobs—accept carrier material in order to be able to implement the printing operation interruption free, even when one input compartment is empty or fails due to a malfunction. The device control employs the destination address defined by the page description language and assigns a logical device address to this destination address, the input compartments being capable of being accessed at the destination address. As a result, thus, a plurality of input compartments are successively emptied in remote mode without the data having to be modified on the part of the page description language. On the contrary, the intervention ensues on the part of the device control of the printer, whereby the required measures are simple due to allocation of logical addresses. The respectively empty or malfunctioning input compartment can be refilled by an operator or automatically, so that an interruption-free printing operation is achieved for an arbitrarily long time.

With the invention, in particular, a plurality of input stations can be linked with one another cascade-like. Input locations or, respectively, compartments of different input stations can thereby be assigned to a common device address. When the input compartment of an input station is empty, a switch is automatically made to another input compartment, particularly to an input compartment of another input station. Recording material that is taken from an input station lying farther away from the printer in the cascade structure is then looped through corresponding channels in the preceding input stations to the printer. The control of the execution sequence can ensue with a central device control or by individual controls allocated to the individual input stations. These controls can be connected to one another in a the master-slave arrangement, whereby, for example, the input station lying closest to the printer forms the master.

The invention is also directed to a printer having an input arrangement including a plurality of input locations, whereby the carrier material to be printed is supplied from one of a plurality of input stations that each respectively comprise a plurality of input locations from which carrier material to be printed is supplied, the print information is present in a standard page description language from which a device controller of the printer determines the information for printing, the page description language indicating a destination address, wherein the device controller allocates a common logical device address to at least two input locations, the device controller allocates the logical device address to the destination address, and given occurrence of a predetermined operating condition of one of the input locations under the logical device address, the controller switches to another input location of the same logical device address and carrier material is then supplied from said another input location. This printer realizes the above method, and also achieves the aforementioned, advantageous effects.

BRIEF DESCRIPTION OF THE DRAWINGS

An exemplary embodiment of the invention is explained below with reference to the drawing.

DETAILED DESCRIPTION OF THE PREFERRED EMBODIMENTS

Figure 1:
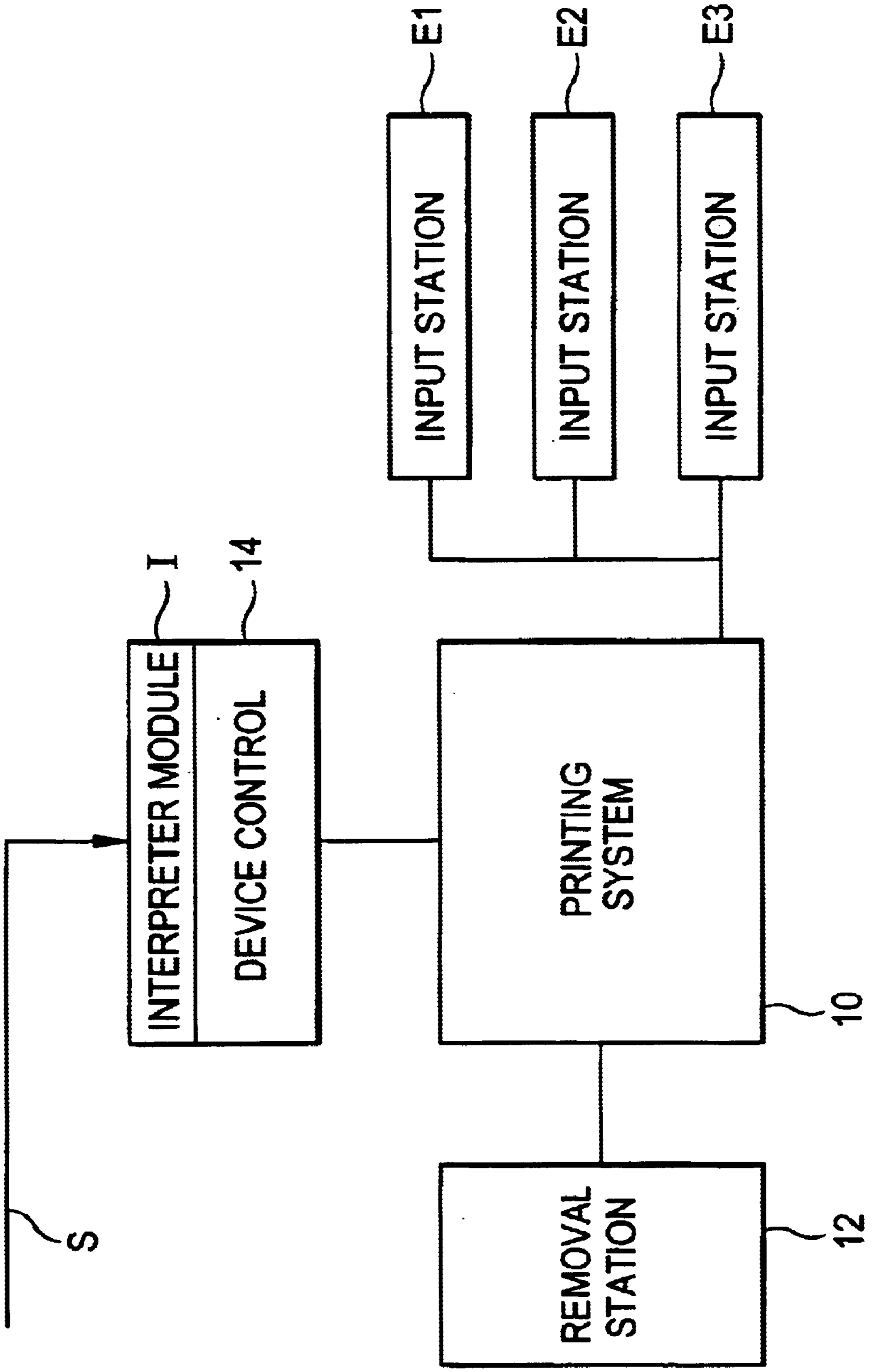
FIG. 1 is a high-performance printer having a plurality of input compartments in the form of a block circuit diagram.

In a block presentation, FIG. 1 schematically shows the structure of a high-performance printer. It has a printing system 10 as well as plurality of input stations E1, E2 and E3 that keep paper to be printed on hand. At the output side, the printing system 10 has a removal station 12 with deposit compartments connected to it. The high-performance printer has a device control 14 that controls the input stations E1, E2 and E3, the printing system 10 and the removal station 12.

The device control 14 contains one or more processors for data processing and editing of signals. In remote mode, information S is supplied to the device control 14 from a higher-ranking control. This information are edited according to a standard page description language, for example according to the known page description languages of PostScript, PCL5 (print control language Version 5) or IPDS (intelligent page data stream). They cover all image information for a page, positioning information, paper size, the output compartment, the input compartment, etc. In the standard page description languages, only a single input compartment form a plurality of input compartments can be referenced with a destination address as an input compartment for a print job. The device control 14 also contains an interpreter module I that determines the hardware instructions required for printing from the information S.

Figure 2:
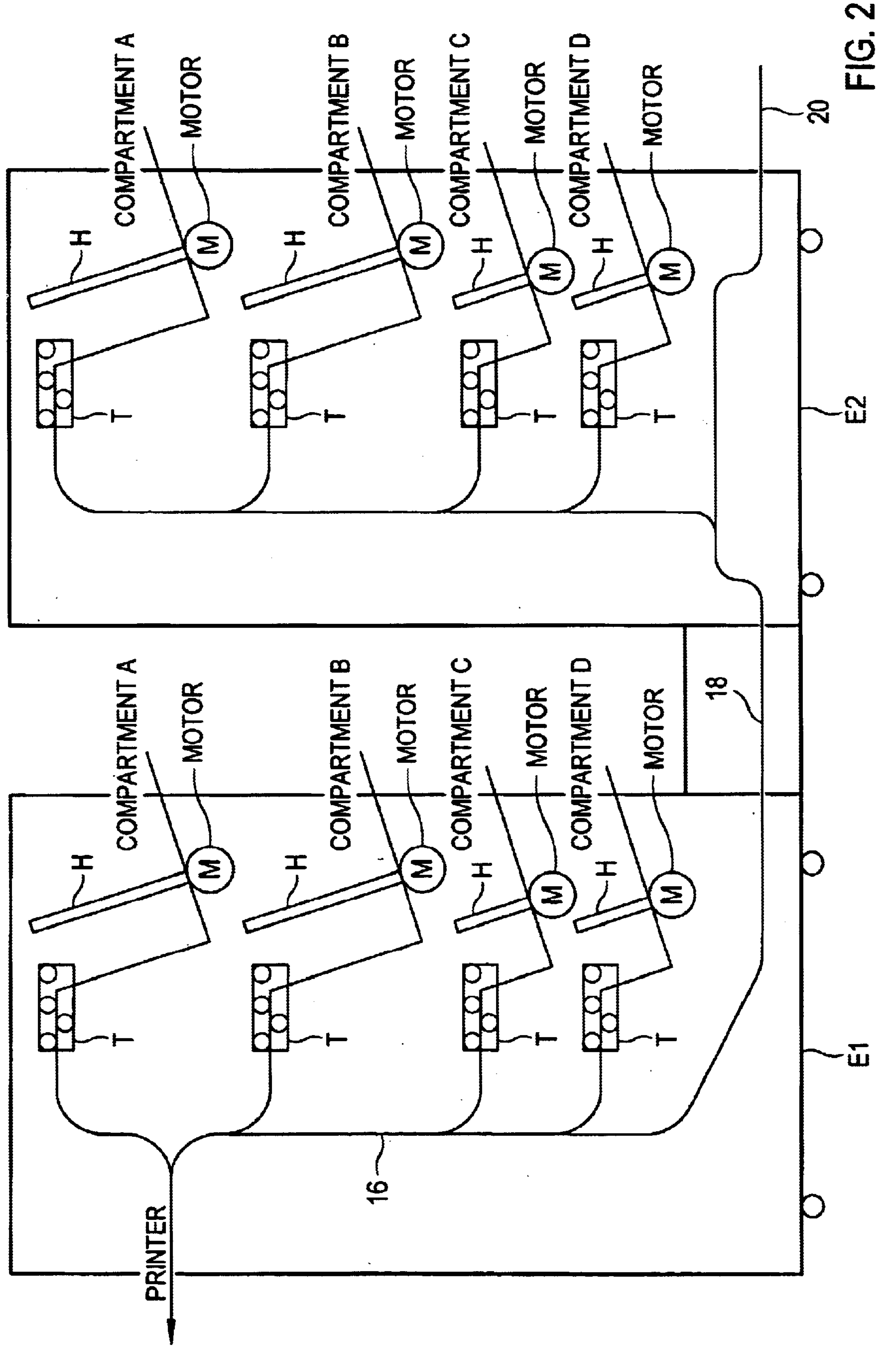
FIG. 2 is a schematic view of two input stations for the high-performance printer each respectively having a plurality of input compartments.

FIG. 2 shows the two input stations E1 and E2 connected to the printing system 10. Each input station E1 and E2 has a plurality of compartments A, B, C and D in which single sheets are kept on hand in the form of a stack. Each compartment A through D has a lifting platform H driven by a motor M that successively readjusts the paper stack corresponding to the number of single sheets withdrawn by a conveyor means T. The single sheets that are withdrawn are collected via a passageway 16 and supplied to the printer. The input station E2 is connected via a connecting passageway 18 to the passageway 16 of the input station E1 that lies closest to the printer 10. A further input station, for example the input station E3, can be connected via the connecting passageway 20. Further details of this paper input arrangement are disclosed in the PCT Patent Application DE 97/02428 whose content is herewith incorporated into the present specification by reference. The standard page description language can now designate one of the compartments A through D of one of the input stations E1 or E2 with a destination address, the single sheet for the momentary print job then being taken therefrom. When the print job comprises a plurality of pages that is greater than the number of sheets of the stack in a compartment, then an error signal is generated when the last sheet of the stack is drawn in. Subsequently, an operator must resupply paper in the appertaining compartment, this leading to an interruption of the printing operations.

Figure 3:
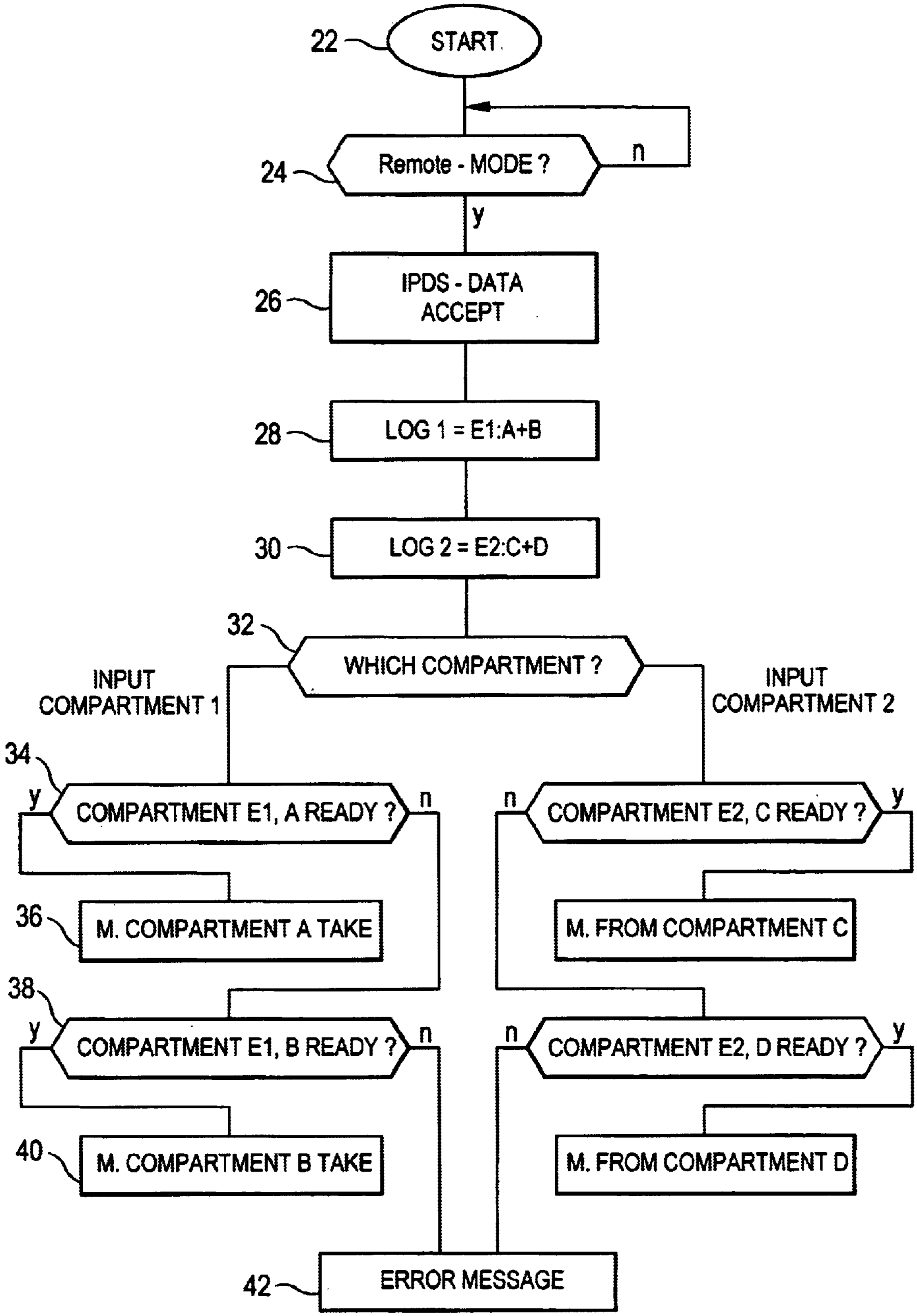
FIG. 3 is a flowchart that illustrates the method steps of the invention.

FIG. 3 shows the method steps of the invention in the form a flowchart, these enabling an interruption-free operation. After the start (step 22), the device control 14 checks whether a remote mode is desired, i.e. that the print information for the printing job is externally generated (step 24). When this is the case, then the print data according to the standard page description language IPDS is accepted in the following step 26. A logical device address LOG1 that physically references the compartments A and B of the input station E1 is allocated in the device control 14 to the input compartment referenced as the destination address in the data, for example x. In step 30, the logical device address LOG2 that references the compartments C and D of the input station E2 are allocated in step 30 to the further destination address y for an input compartment.

A determination is made in the following step 32 with respect to the logical address that was communicated via the destination address of the page description language. The left branch of the method steps shown in FIG. 3 refers to the destination address to which the logical address LOG1 is allocated; the right-hand branch of the method steps refers to the logical device address LOG2.

A check is carried out in step 34 to see whether the compartment A of the input station 1 is ready to output single sheets. When this is the case (step 36), then individual sheets are taken from the compartment A. When the compartment A of the input station E1 is not ready to output sheet material, for example because it is malfunctioning or empty, then a branch is made to the step 38, and a check is carried out thereat to see whether the compartment B of the input station E1 is in readiness. When this applies, then sheet material is taken from the compartment B in step 40. Otherwise, a branch is made to step 42 in which an error message is generated.

When the compartment A is not ready to output sheet material, for example because it is empty, then a branch is thus immediately made to compartment . B from which sheet material is then taken. During this removal of sheet material from the compartment B, compartment A can be refilled with sheet material and be switched into readiness. To that end, the motor M of the lifting platform H of the compartment A is automatically driven by the device control such that the lifting platform H moves from the current unloading position into a loading position and returns into a readiness position after being loaded. The same is true for compartment B, i.e. sheet material can be immediately taken from compartment A when compartment B is empty, and compartment B can be refilled with sheet material. An interruption-free operation is assured in this way. The analogous case applies to a print job wherein, in conformity with the IPDS data, the other input location is indicated as a destination address y for the input compartment in order, for example, to print paper having a different format. In the present example, the logical device address LOG2 that physically references the compartments C and D of the input station E2 is allocated to this input location.

Figure 4:
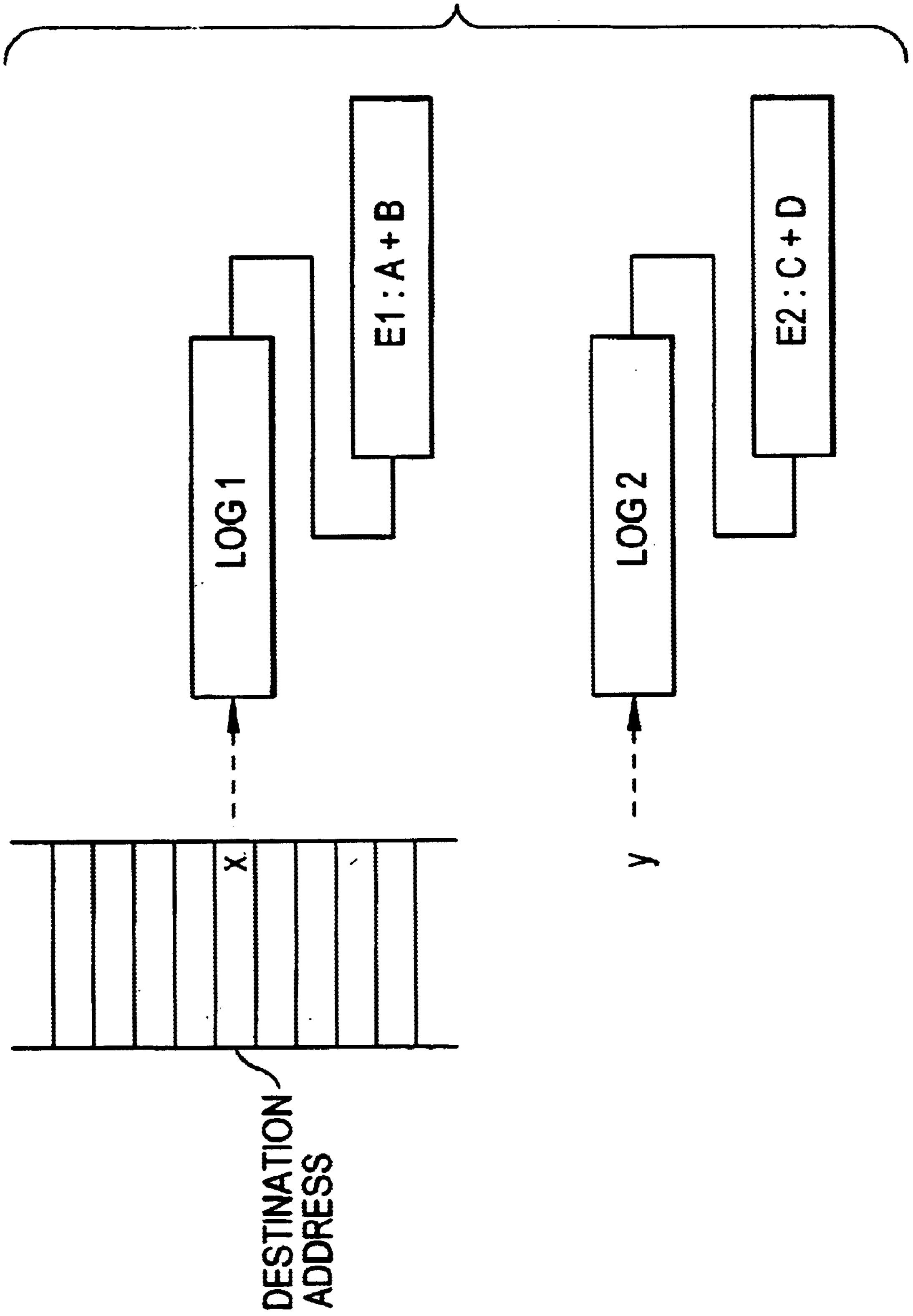
FIG. 4 is a block presentation of the allocation of the individual addresses.

FIG. 4 illustrates the allocations undertaken in the method. The print information contains the input location of the carrier material as the destination address x or y under the date. The destination address x has the logical address LOG1 allocated to it that physically references the compartments A and B of the input station E1. Via the logical address LOG2, the destination address y leads to the removal station E2 and to the compartments C and D. Of course, an arbitrary combination of input compartments can be allocated to the respective destination address according to the disclosed method steps.

Figure 5:
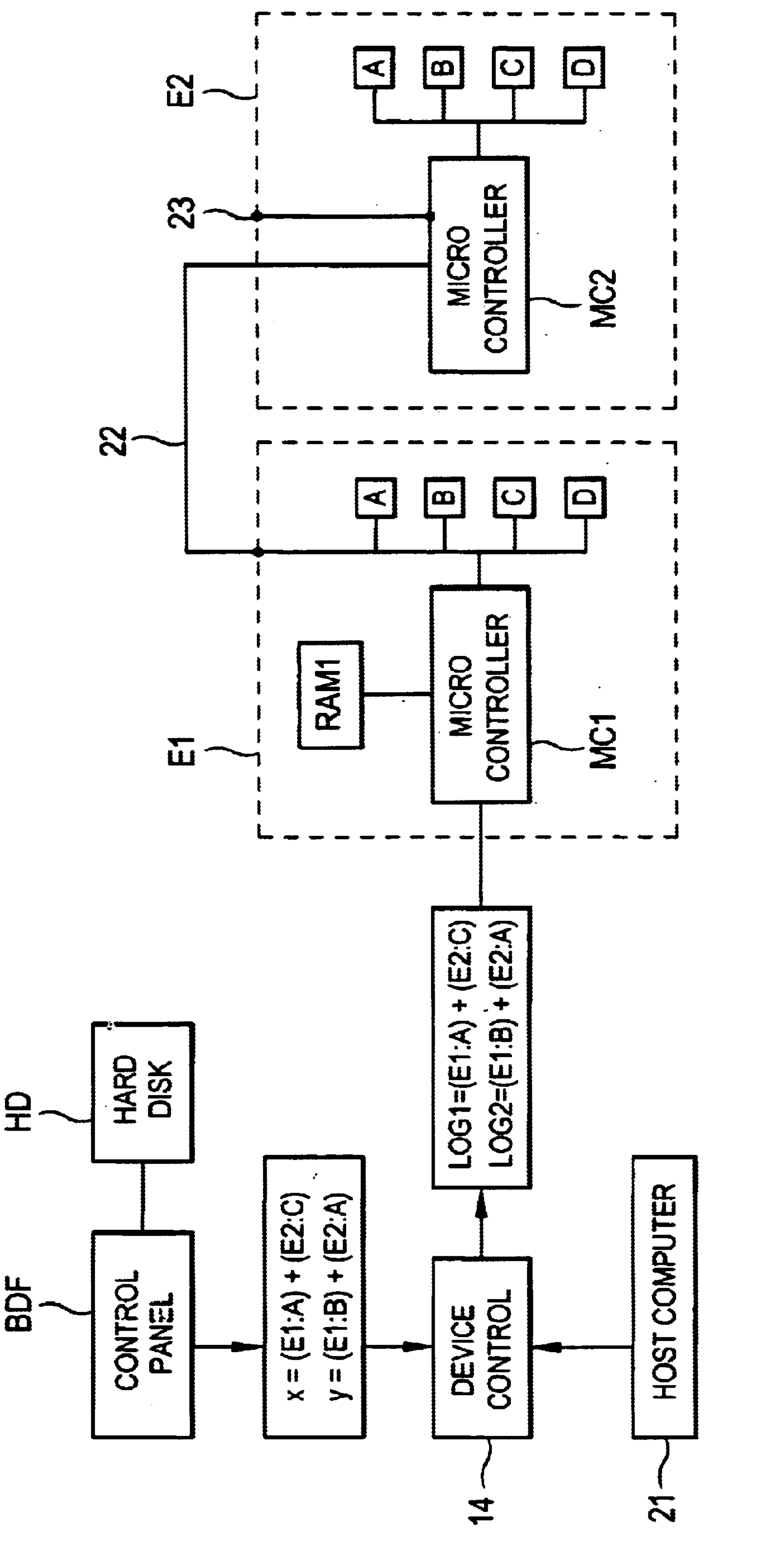
FIG. 5 is a block circuit diagram of a printer control having two input stations.

FIG. 5 shows how the allocation data is edited and utilized. Allocation data is input via a touch screen control panel BDF connected to the printing system 10 of the printer, for example to the affect that the input location A of the input station E1 and the input location C of the input station E2 are allocated to the destination address x. Correspondingly, the input location B of the input station E1 and the input location A of the input station E2 are allocated to a second destination address y. This data is secured, on the one hand, in a non-volatile memory connected to the control panel BDF, for example in a hard disk store HD. Second, this data is communicated to the device control 14 of the printer. This assigns logical addresses LOG1 and LOG2 to the addresses x and y, whereby the following can be valid: x=LOG1 and y=LOG2. When this condition does not apply, a corresponding allocation must be undertaken in the device control 14. This can likewise be input via the control panel BDF, determined via an internal algorithm and/or assigned on the basis with a data bank.

The allocation data between the logical device address LOG1 and LOG2 and the input locations A, B, C and D of the input stations E1 and E2 are reported from the device control 14 to the micro-controller MC1 of the input station E1 and are deposited thereat in a volatile memory RAM1. The micro-controller MC1 is connected both the input compartments A, B, C, D of the input station E1 as well as—via an interface 22—to a micro-controller MC2 of the input station E2 in order to drive the latter. It assumes a high-ranking control function (master-slave) relative to the micro-controller MC2 and can also identically monitor potentially other input stations E3 and E4 that are in turn connected to the micro-controller MC2 via an interface 23.

Figure 6:
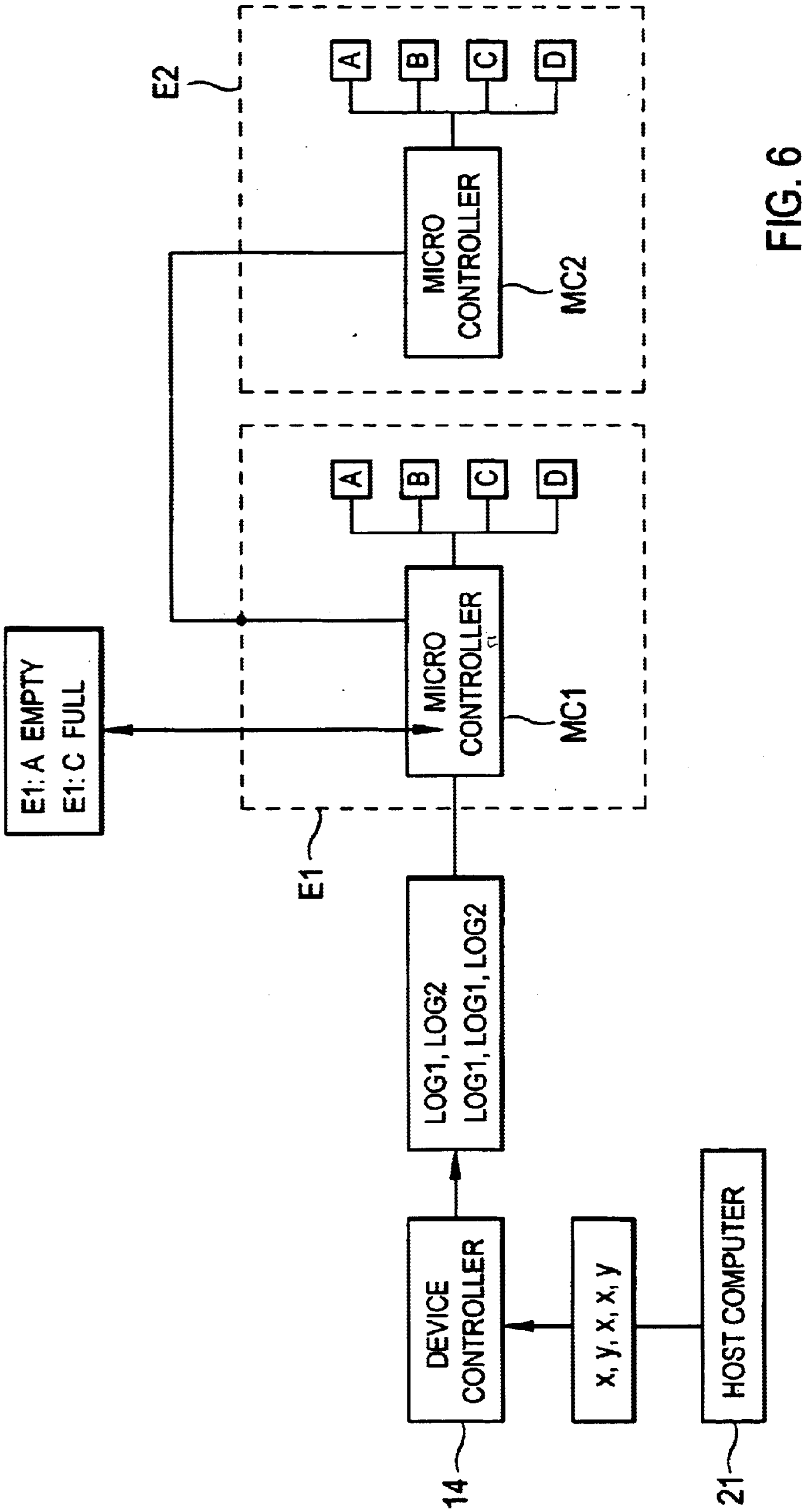
FIG. 6 is a schematic executive sequence for removing a sequence of sheets from the input stations.

FIG. 6 shows how print jobs that proceed from a host computer 21 to the printer are processed. The print control 14 recognizes the destination addresses x and y within the print data stream and converts these into the logical addresses LOG1, LOG2, whereby—as mentioned above—x=LOG1 and y=LOG2 can apply.

Accordingly, the logical address sequence LOG1, LOG2, LOG1, LOG1, LOG2 derives in the illustrated destination address sequence x, y, x, x, y. This data sequence proceeds into the micro-controller MC1. When, as shown in FIG. 6, the status message "compartment C full" from the input station E2 is present for the micro-controller MC1 but the status message "empty" is present from the input compartment A of the input station E1, then it drives the micro-controller MC2 for all LOG 1 requests, as a result whereof compartment C of the input station E2 is driven to output a sheet in the configuration shown in FIG. 5. By contrast thereto, the sheets required under the address LOG2 are taken from compartment B of the input station E1 until this, too, is empty. Only then is a switch made to compartment A of station E2.

A fundamentally arbitrarily great-number of input locations can be offered with the invention for each logical address supported by the printer language and referenced with a destination address, in that the compartments A, B, C, D, etc., allocated to the logical device address are distributed onto an arbitrary plurality of input stations E1, E2, E3, etc. When, for example, three input locations (compartments) are required for a specific paper grade or, respectively, logical device address, then for instance, the compartment A of the input station E1, the compartment B of the input station E2 and the compartment B of the input station E3 can be allocated to this logical device address.

The input stations are modularly constructed insofar as they respectively comprise an output path 18 and an input path 20. As a result thereof, a plurality of input stations can be serially coupled following one another without further ado, and a sheet of paper that is required from a back input station, i.e. an input station at a greater distance from the printer input, can be transported through the front input stations to the printer. An internal controller that lies in the input station lying closest to the printer thereby controls the higher-ranking executive sequence. It receives a request of the printer for a specific paper grade, i.e. the input location prescribed by the printer language, and decides which of the physical input compartments is selected by which input station. Subsequently, it sends a removal signal to this input station or directly to the appertaining input location and also sends a signal to all intervening input stations to convey the sheet through in the direction toward the printer (bypass). The controller of the first input station E1 assumes a master function insofar as the following input stations E2, E3, etc. have a slave function, so that a cascade-like arrangement of the input locations is present.

Although other modifications and changes may be suggested by those skilled in the art, it is the intention of the inventors to embody within the patent warranted hereon all changes and modifications as reasonably and properly come within the scope of their contribution to the art.

We claim:

1. A method for controlling a printer having a plurality of input locations, comprising the steps of:

supplying carrier material to be printed to a printing system from one of a plurality of input stations, each of said input stations respectively comprises a plurality of input locations, editing print information in a standard page description language from which a device controller of the printer determines information for printing, the page description language referencing a single input location with a destination address, allocating a common logical device address to at least two of said input locations, allocating the logical device address to the destination address in the device controller, and given occurrence of a predetermined operating condition of one of the input locations under the logical device address, switching to another input location allocated to the same logical device address, and supplying carrier material from said other input location.

2. A method according to claim 1, comprising the step of:

outputting a signal from the input locations under the common logical device address respectively when a delivery of carrier material from the respective input location is no longer possible, the device controller interpreting the signal for switching to the other input location.

3. A method according to claim 1, wherein said page description language is one of: PostScript, PCL, and IPDS.

4. A method according to claim 1, wherein said predetermined operating condition is an empty condition of the respective input location.

5. A method according to claim 1, wherein said predetermined operating condition is a malfunctioning condition of the respective input location.

6. An input arrangement for a printer, comprising:

a plurality of input locations, a device controller, a plurality of input stations that each respectively comprise a plurality of input locations from which carrier material to be printed is supplied, the print information are present in a standard page description language from which the device controller of the printer determines information for printing, the page description language indicating a destination address, wherein the device controller allocates a common logical device address to at least two input locations, wherein the device controller allocates the logical device address to the destination address, and given occurrence of a predetermined operating condition of one of the input locations under the logical device address, the controller switches to another input location of the same logical device address and carrier material is then supplied from said another input location.

7. An input arrangement for a printer according to claim 6, wherein the input locations under the common logical device address respectively output a signal when a delivery of carrier material from the respective input location is no longer possible, the device controller interpreting said signal for switching to the other input location.

8. An input arrangement for a printer according to claim 6, wherein said page description language is one of: PostScript, PCL, and IPDS.

9. An input arrangement for a printer according to claim 6, wherein said predetermined operating condition includes an empty condition of the respective input location.

10. An input arrangement for a printer according to claim 6, wherein said predetermined operating condition includes a malfunctioning condition of the respective input location.

11. An input arrangement for a printer according to claim 6, further comprising:

a central device controller via which switching from one input location to another input location of the same logical device address ensues.

12. An input arrangement for a printer according to claim 6, wherein the input stations are modularly constructed with a respective input path and an output path, wherein sheets that are supplied from the input path are delivered directly to the output path.

13. An input arrangement for a printer according to claim 12, wherein one of said input stations includes a control means that receives information about one of a currently required input location, a destination address of said currently required input location, and an allocated logical address from a central device controller, and that selects a currently operational compartment from the plurality of compartments that are allocated to said input location.

14. An input arrangement for a printer according to claim 13, wherein the control means contains an allocation memory wherein allocations between one of the input location, the destination address of said input location and the logical address on one hand and the respectively appertaining compartments, on another hand, are stored.

15. An input arrangement for a printer according to claim 14, wherein the allocation memory can be filled with allocation data via a control panel of the printer and via the central device controller.

* * * * *